US007676595B2

(12) United States Patent
Ettikan

(10) Patent No.: US 7,676,595 B2
(45) Date of Patent: Mar. 9, 2010

(54) ANYCAST ADDRESSING FOR INTERNET PROTOCOL VERSION SIX

(75) Inventor: Karuppiah Kandasamy Ettikan, Penang (MY)

(73) Assignee: Intel Corporation, Santa Clara, CA (US)

( * ) Notice: Subject to any disclaimer, the term of this patent is extended or adjusted under 35 U.S.C. 154(b) by 1808 days.

(21) Appl. No.: 10/749,333

(22) Filed: Dec. 29, 2003

(65) Prior Publication Data

US 2005/0198367 A1 Sep. 8, 2005

(51) Int. Cl.
*G06F 15/173* (2006.01)
(52) U.S. Cl. ............... 709/238; 709/245; 370/328; 370/390
(58) Field of Classification Search .......... 709/245
See application file for complete search history.

(56) References Cited

U.S. PATENT DOCUMENTS

| 2002/0016860 | A1* | 2/2002 | Garcia-Luna-Aceves et al. | 709/245 |
| 2005/0044141 | A1* | 2/2005 | Hameleers et al. | 709/204 |

FOREIGN PATENT DOCUMENTS

| WO | 2005/067259 A2 | 7/2005 |
| WO | 2005/067259 A3 | 7/2005 |

OTHER PUBLICATIONS

Hinden, RFC 2373, Jul. 1998.*
Hinden, RFC 2374, Jul. 1998.*
Ettikan, K., et al., "An Analysis of Anycast Architechture", *IASTED International Conference Communications and Computer Networks*, (Nov. 4-6, 2002), 5 pages.
Hinden, R., "IP Version 6 Addressing Architecture", *RFC 2373*, (Jul. 1998), pp. 1-19.
Johnson, D., et al., "Reserved IPv6 Subnet Anycast Addresses", *RFC 2526*, (Mar. 1999), pp. 1-6.
Partridge, C., et al., "Host Anycast Service", *RFC 1546*, (Nov. 1993), pp. 1-8.
"PCT/US2004/04351 International Search Report", (Jun. 3, 2005),11 pages.
Hagino, J. I., et al., "An Analysis of IPv6 Anycast", *Internet Engineering Task Force*, http://playground.iijlab.net/i-d/draft-itojun-ipv6-anycast-analysis-02.txt, (Feb. 27, 2001),1-8.
Hinden, et al., "RFC 3513: Internet Protocol version 6(IPv6) Addressing Architecture", *Internet, IETF, Network Working Group*, ftp://ftp.isi.edu/in-notes/rfc3513.txt,(Apr. 2003),1-26.

(Continued)

*Primary Examiner*—Hassan Phillips
*Assistant Examiner*—Glenford Madamba
(74) *Attorney, Agent, or Firm*—Daly, Crowley Mofford & Durkee, LLP

(57) ABSTRACT

A protocol associated with an Internet protocol version six (IPv6) network address included within a network packet provides both unicast and anycast addressing, while having the same bit locations and bit functions associated with a top-level aggregation identifier, a next-level aggregation identifier, and a site-level aggregation identifier. A prefix associated with the three most significant bits of the network address identifies the network address as being a unicast address, an anycast address, or both a unicast and an anycast address. The prefix that identifies the network address as being both a unicast and an anycast address allows routers to have smaller routing tables.

32 Claims, 5 Drawing Sheets

OTHER PUBLICATIONS

Katabi, D., et al., "A Framework for Global IP-Anycast(GIA)", *IETF, Internet, Network Working Group,* http://www.watersprings.org/pub/id/draft-katabi-global-anycast-00.txt,(Jun. 1999),1-20.

Fuller et al. "Supernetting: an Address Assignment and Aggregation Strategy", RFC 1338, Jun. 1992, 19 pages.

Office Action received for Chinese Patent Application No. 200480039383.8, mailed on Jun. 5, 2009, 5 pages of Office Action and 10 pages English Translation.

International Search Report and Written Opinion received for PCT Patent Application No. PCT/US2004/043051, mailed on Jun. 3, 2005, 11 pages.

International Preliminary Report on Patentability received for PCT Patent Application No. PCT/US2004/043051, mailed on Oct. 12, 2006, 7 pages.

Office Action received for EP Patent Application No. 04815165.8, mailed on Nov. 7, 2006, 2 pages.

Office Action received for EP Patent Application No. 04815165.8, mailed on Feb. 13, 2008, 6 pages.

Office Action received for EP Patent Application No. 04815165.8, mailed on Mar. 9, 2009, 8 pages.

* cited by examiner

ANYCAST ADDRESSING FOR INTERNET PROTOCOL VERSION SIX

CROSS REFERENCE TO RELATED APPLICATIONS

Not Applicable

STATEMENT REGARDING FEDERALLY SPONSORED RESEARCH

Not Applicable or

FIELD OF THE INVENTION

This invention relates generally to network addressing, and in particular to anycast addressing used in Internet protocol version six (IPv6).

BACKGROUND OF THE INVENTION

Internet communication formats are governed by the Internet Engineering Task Force (IETF). Internet protocol (IP) version four (IPv4) has provided the basic communication mechanism of the global Internet since its inception in the 1970s. As is known, communication on the Internet is comprised of Internet datagrams contained within network packets, each datagram having a datagram header and a datagram data area. The datagram header includes a source IP address and a destination IP address, which in IPv4 are each thirty-two bits in length. IPv4 addresses include a "netid" and a "hostid," wherein the netid specifies a network and the hostid specifies a host, for example, an individual computer on the network.

There are a variety of ways in which the destination address can be used. For example, in "unicast" addressing, the destination address directs the network packet to one destination. Therefore, unicast is a point-to-point communication. IPv4 also supports "multicast" addressing for which a datagram is directed to a selected group of recipient hosts, rather than to one host. Therefore, multicast is a point to multiple point communication. Multicast is used, for example, in sending video and audio streams simultaneously to a group of recipients. IPv4 also supports "broadcast" addressing, for which a datagram is directed to all recipients connected to the network. The type of address, unicast, multicast, or broadcast, is identified by a few header bits near the beginning of the IPv4 packet header.

Internet protocol version six (IPv6) was generated by the IETF in the mid 1990's. The generation of IPv6 was necessitated by a variety of factors. Notably, the extraordinary proliferation of networks and devices connected to the Internet has resulted in an anticipated shortcoming of available Internet addresses under the IPv4 32-bit addressing technique. Therefore, among many other changes, IPv6 adopted a 128-bit addressing technique.

IPv6 retains unicast and multicast addressing and communication mechanisms associated with IPv4, but eliminates the broadcast capability. IPv6 also includes a new addressing referred to as "anycast." Anycast is an addressing intended to communicate to a nearest one of a designated group of anycast members. Each of the group of anycast members has the same anycast address. However, a communication to the anycast group is sent only to the nearest anycast member, as is described in more detail below.

Request for Comments (RFC) 3513, or simply RFC3513, identifies the "anycast" address as an address that is assigned to more than one network interface, with the property that a data packet (i.e., a datagram) sent to an anycast address is routed to the "nearest" network interface having that address, according to a routing protocol's measure of distance. The nearest host can be determined in a variety of ways, for example, by a smallest number of router hops that a network packet must take to reach a selected member of the anycast group, or, for another example, by a smallest time delay associated with router port selections.

In one particular embodiment, an anycast group can include servers having redundant data and functionality. When a host communicates to the anycast group of servers, the nearest server receives the network packet and responds accordingly.

Currently (e.g., as specified in RFC3513), anycast addresses are allocated from the unicast address space. Thus, anycast addresses are syntactically indistinguishable from unicast addresses. When a unicast address is assigned to more than one anycast group member, thus turning it into an anycast address, the member to which the address is assigned must be explicitly configured to know that it should recognize the anycast address.

There are a variety of unresolved functional issues regarding anycast addressing. Some issues are discussed in an RFC1546. For example, a first network packet sent from a host to an anycast group of servers, using an anycast destination address, is received by one particular server of the anycast group of servers. However, if a second network packet is sent from the host to the anycast group of servers, using the anycast destination address, there is no guarantee that the second network packet will be received by the same server that received the first network packet. However, it may be desirable, in many instances, for the server that receives the second network packet and subsequent network packets to be the same server that received the first network packet. Issues such as this can be resolved in a variety of ways. For example, the server, upon receiving the first network packet, can respond with a unicast address, and the host and the server can thereafter communicate with unicast addressed packets.

Not only are there remaining functional issues regarding anycast addressing, but the specific bit-level structure of the anycast address itself has not yet been defined. Use of an anycast address has certain advantages, including but not limited to, shorter routing paths and resulting faster communications between a host and an anycast member. However, IPv6 does not specify the full intended use of anycast addressing, does not resolve all of its functional issues, and does not specify its bit-level structure.

It would, therefore, be desirable to overcome the aforesaid and other disadvantages, and to provide a system and method specifying the anycast bit-level address structure in a way capable of using anycast addressing, unicast addressing, and multicast addressing together on the same network.

BRIEF DESCRIPTION OF THE DRAWINGS

The foregoing features of the invention, as well as the invention itself may be more fully understood from the following detailed description of the drawings, in which.

DETAILED DESCRIPTION OF THE INVENTION

Figure 1:
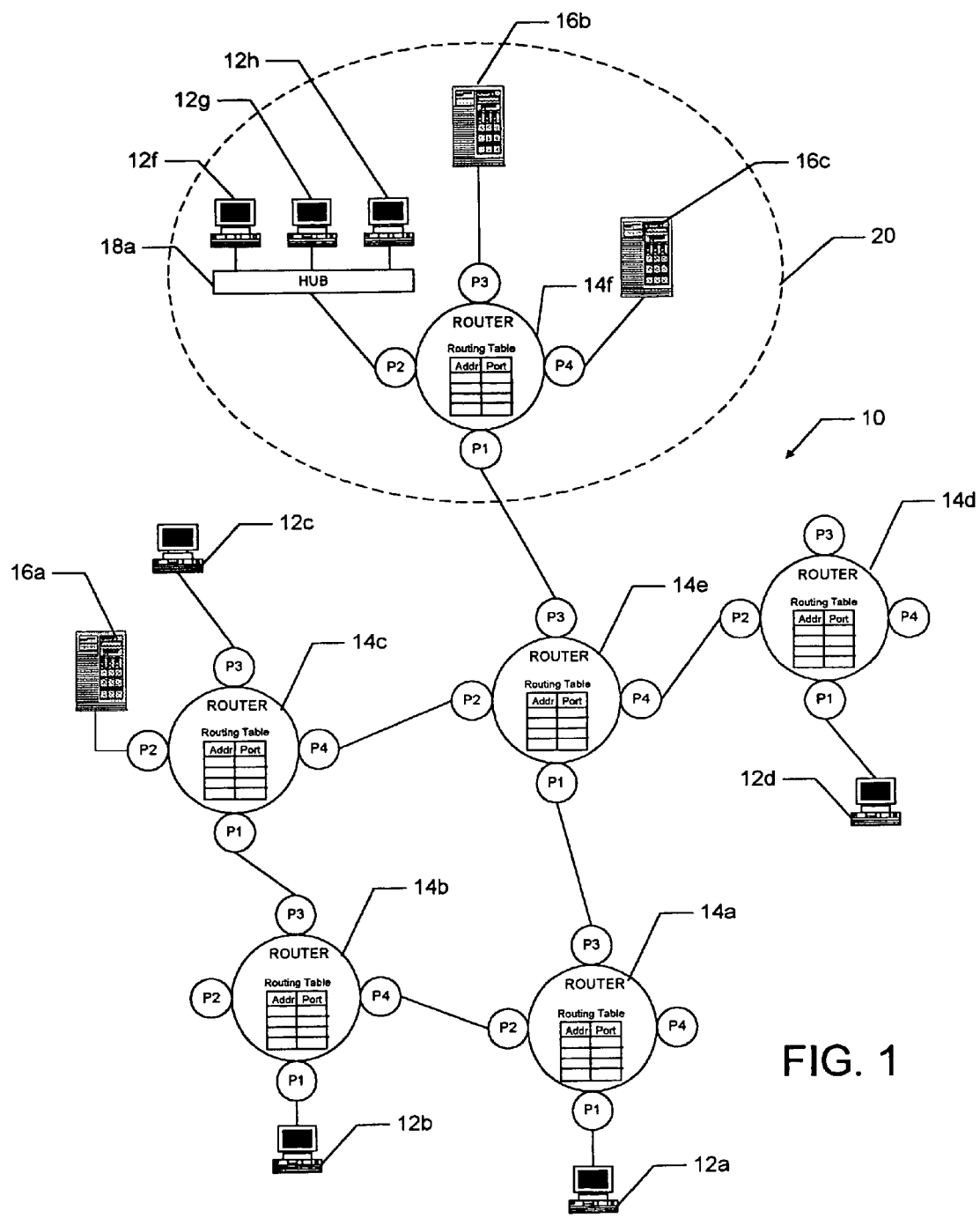
FIG. 1 is a block diagram of an exemplary network having an anycast group.

Referring to FIG. 1, an exemplary network 10 includes a plurality of host computers 12a-12h, for example, personal computers, interconnected via a plurality of routers 14a-14f. The network 10 can also include servers 16a-16c also coupled to the network, which can be, for example, web servers, application servers, or database servers. Each router has two or more ports, here shown as four ports P1-P4 associated with each router 14a-14f.

As is known, network communications include network packets containing network datagrams, each having a source address, a destination address, and user data. For IPv4, the source and destination addresses are each thirty-two bits long, and for IPv6, the source and destination addresses are each 128 bits long. The network packets travel along the network 10.

Taking the router 14a as representative of each of the routers 14a-14f, the router 14a has four ports P1-P4, which provide input/output connectivity to the network 10. The router 14a also includes a routing table, which is described more fully below in conjunction with FIG. 3. The routing table of the router 14a maps a destination network address contained in a network packet to a router port, for example one of the four ports P1-P4 associated with the router 14a. In this way, the destination of the network packet is identified in the routing table, and the network packet is sent out a port identified in the routing table. Eventually, after one or more hops between the routers 14a-14f, the network packet finds its way to a host 12a-12h or to a server 16a-16c having the destination address.

An organization, for example a corporation, represented by the dashed oval 20, can have a dedicated router 14f, through which the host computers 12d-12h and the servers 16b, 16c are connected to the network 10. Hub 18a provides connectivity from a group of host computers 12f-12h, to port P2 of the router 14f.

An efficient routing of a network packet, which is performed in a small amount of time, tends to have a small number of hops between routers, and paths between the routers tend to be relatively fast. Alternatively, it will be recognized that an inefficient routing, which is performed in a larger amount of time, tends to have a larger number of hops between routers, and paths between the routers tend to be relatively slow.

As is known, a conventional network packet contains a hop count corresponding to a number of hops between routers. If the hop count becomes large, for example thirty-one, the network packet is dropped, typically resulting in an error message returned to the sender. As is also know, a conventional router records variety of metrics associated with its ports. For example a router can record time delays associated with data output from each respective port.

For conventional unicast addressing, a network packet is sent from a network host to a specific network destination identified by a destination unicast address. The network packet conventionally includes a unicast source address and a unicast destination address. The network destination can be, for example, a router, a server, or another host. Taking the host computer 12a as representative of a source of a network packet and the host computer 12d as representative of a destination of the network packet, the network packet can travel to the host computer 12d in a variety of ways. For example, the network packet can travel from the host computer 12a to the router 14a. The router 14a can find a destination address within the network packet in its routing table and can forward the message accordingly to the router 14b. Similarly, the router 14b can forward the network packet to the router 14c, which can forward the network packet to the router 14e, which can forward the network packet to the router 14d, which then delivers the network packet to the host computer 12d. Another path, requiring fewer router hops can be seen from the router 14a, to the router 14e, to the router 14d.

As described above, for anycast addressing, a network packet is sent from a network host to a closest member of an anycast group, each member of the anycast group having the same anycast destination address. The network packet can include, for example, a unicast source address and an anycast destination address. Taking the host computer 12a as representative of a source of a network packet and the servers 16a, 16b as representative of destinations of the network packet, which are members of an anycast group, the network packet can travel to either of the servers 16a, 16b in a variety of ways. However, the network packet will travel from the host computer 12a to a particular destination member of the anycast group of servers 16a, 16b along a path shorter than a different and longer path that the network packet travels to any other member of the anycast group of servers 16a, 16b.

Figure 2:
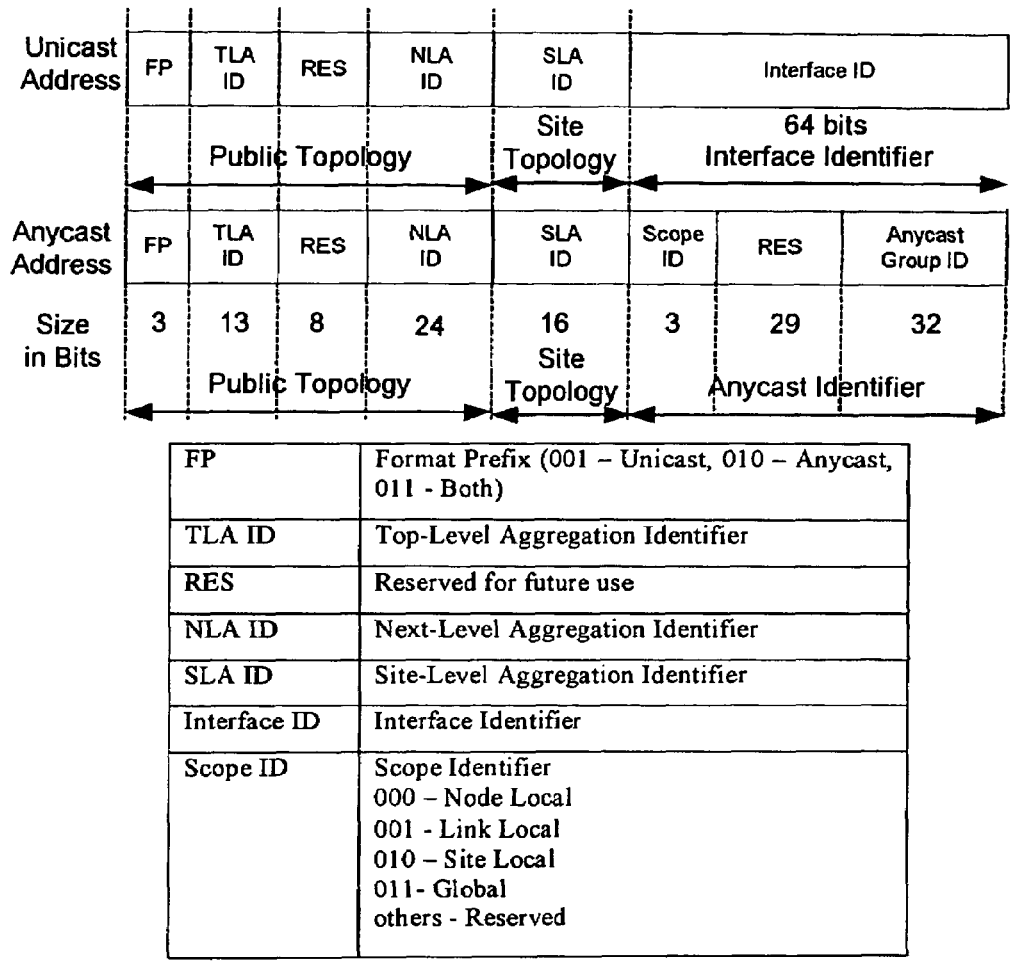
FIG. 2 is bit chart showing both a unicast network address and an anycast network address in accordance with the present invention.

Referring now to FIG. 2, the format of an IPv6 unicast address specified in RFC 2372 is shown to include a variety of fields, each having a number of bits as shown, totaling 128 bits in accordance with IPv6 address length. From left to right, label FP is a format prefix (e.g., 001 for unicast), label TLA ID is a top-level aggregation identifier, label RES identifies bits reserved for future use, label NLA ID is a next-level aggregation identifier, label SLA ID is a site-level aggregation identifier, and label Interface ID is an interface identifier corresponding to a physical address of a network entity, for example an Ethernet address of a host.

As is known, the TLA ID, the NLA ID, and the SLA ID portions of the network address are each associated with routers at a different level of an address hierarchy. Routers at a high level of the hierarchy generally use the TLA ID for routing purposes, routers at a middle level of hierarchy generally use the NLA ID for routing purposes, and routers at the lowest level of hierarchy generally use the SLA ID for routing purposes. The network address classifications of TLA ID, NLA ID and SLA ID ease packet processing performed by routers corresponding to their position within the hierarchy. For example, a TLA level router can process the TLA ID to establish a route, an NLA level router can process the NLA ID to establish a route, and an SLA level router can process the SLA ID to establish a route. Address allocations are also generated based on the hierarchy level.

As shown in FIG. 2, an anycast address in accordance with the present invention includes a most significant 64 bits having the same locations and the same functions as the unicast address described above. However, the three most significant bits of the anycast address, which are the prefix bits, FP, are assigned a different prefix number than the unicast address. For example, a prefix for the unicast address can be 001 and a prefix for the anycast address can be 010.

As described above, for a unicast address, the least significant sixty-four bits of the network address, bits 0-63, are used to identify a physical address. However, for an anycast address, the least significant sixty-four bits can be assigned in the following way. The least significant thirty-two bits can be used as an anycast group identifier. However, in other embodiments, more than or fewer than thirty-two bits can be used. As described above in conjunction with FIG. 1, each member of a particular anycast group is assigned the same anycast address, including the same anycast group identifier. Anycast group members can be routers, servers, hosts, etc.

Bits sixty-one through sixty-three are used as a scope identifier. However, in other embodiments, others of the bits can be used, and more than three bits or fewer than three bits can be used. The scope identifier allows restriction as to the visibility of anycast group members to other portions of the network. In one particular embodiment as shown, the anycast scope identifier has four options, identified as node local, link local, site local, and global. The node local identifier allows an anycast address assigned to an anycast group member to be seen only by network entities within a network node, (e.g., self-attached interfaces and logical interfaces). The node local identifier can be used, for example, to do self-check of a network node, which does not require external communication beyond the node. The link local identifier allows a wider visibility, allowing an anycast address assigned to an anycast group member to be seen only by those network entities connected to the same link, (e.g., other peer nodes) to which the anycast group member is connected. In one particular embodiment, the packets with link local visibility are not visible beyond a particular router. The site local identifier allows a wider visibility, allowing packets to be transmitted within a self-contained border corresponding to a specific network site (e.g., the network site can be an organization's network such as an Intranet). The network site can be coupled to the Internet, however, in one particular embodiment, anycast packets having a site local identifier are not routed to the Internet. The global identifier allows a still wider visibility, allowing an anycast address assigned to an anycast group member to be seen by all network entities connected to any of the interconnected networks, e.g., the Internet.

It should be appreciated that an anycast group can include any network nodes, for example, routers, and the routers can be at any one of the three levels of router hierarchy. Therefore, a group of anycast nodes, in addition to having an anycast group ID and a scope ID, at a high level of hierarchy have only a TLA ID, at a middle level of hierarchy have both a TLA ID and an SLA ID, and at a lowest level of hierarchy can have a TLA ID, an NLA ID, and an SLA ID. Each of the above is identified as an anycast address by way of the prefix, FP, but can otherwise be identical to a unicast address. The prefix, FP, plays an important role in distinguishing the anycast address from other address types.

Figure 3:
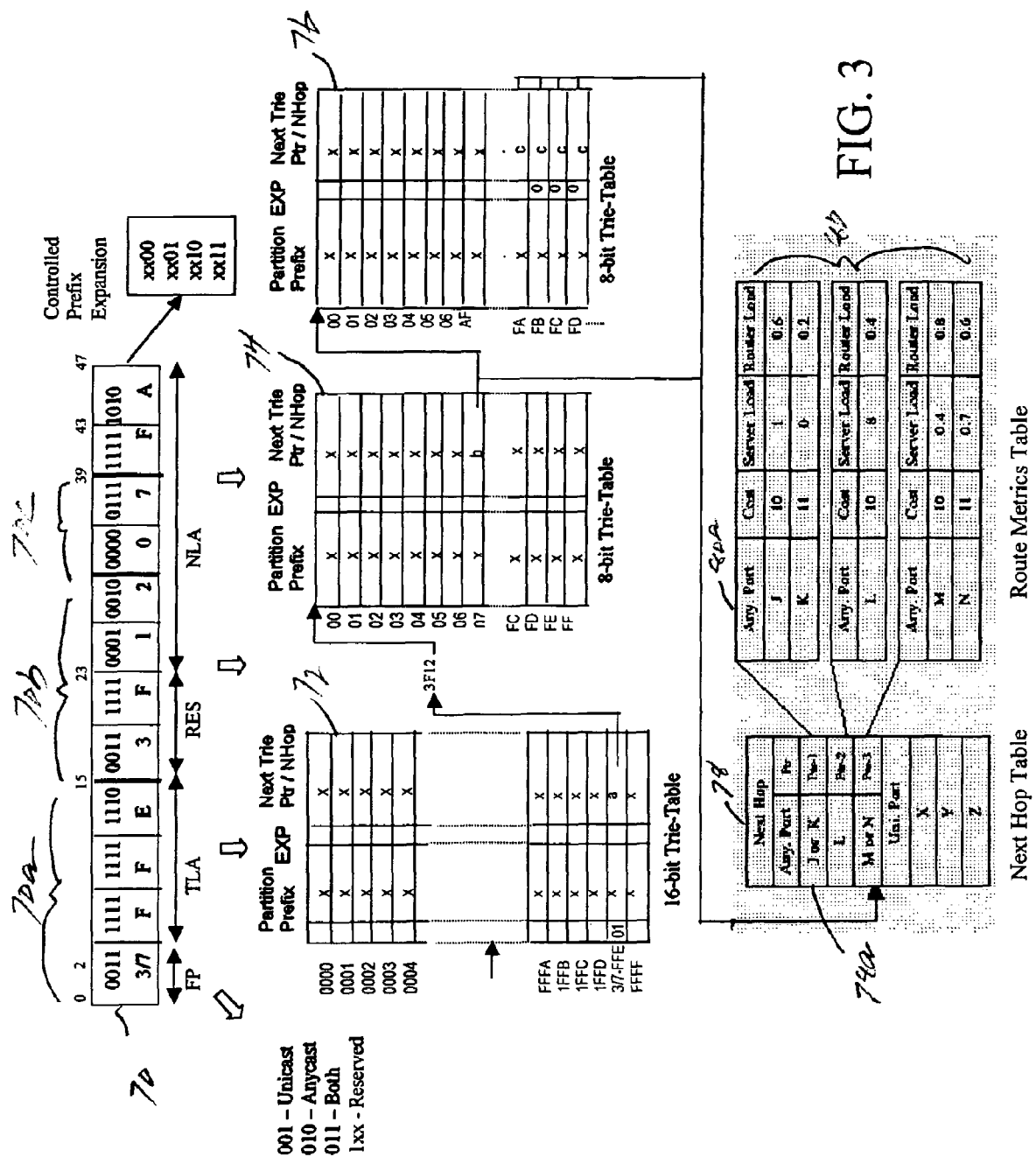
FIG. 3 is a chart showing routing tables used in conjunction with the anycast and unicast network addresses of FIG. 2.

It will be seen in conjunction with FIG. 3, that the prefix, FP, can also be provided as "both," to identify that a particular network address is both a unicast address and an anycast address.

While, for the anycast address, particular selected ones of the sixty-four least significant bits of the network address are associated with the anycast scope identifier and with the anycast group identifier, it should be understood that, in other embodiments, other selected ones of the sixty-four least significant bits of the network address can be associated with the anycast scope identifier and with the anycast group identifier, including other numbers of bits and including other bit codings associated with the scope identifier.

Referring now to FIG. 3, the most significant forty-eight bits of a network address 70 are shown, which have the same function and bit location as the most significant forty-eight bits of the unicast and the anycast network addresses shown in conjunction with FIG. 2. Also shown is a hierarchical routing table structure associated with a router, having a 16-bit first trie-table 72, 8-bit second and third trie-tables 74, 76, respectively, a next hop table 78, and a metrics table 80. First, second, and third portions 70a, 70b, 70c of the network address 70, delineated by dark bars, are associated with the first, second, and third trie-tables 72, 74, 76, respectively. Each of the first, second, and third portions 70a, 70b, 70c of the network address 70 are used to find, where one exists, an address match in a corresponding trie-table. An address match in the second or third trie tables 74, 76 results in entry into the next hop table 78, which specifies one or more output ports out of which the router is to send the network packet. If the network address 70 is an anycast address as identified by the prefix, FP, it may have more than one possible destination within a corresponding anycast group. However, the packet will be routed to the nearest destination, as further described below. If no address match is found in the second or third trie-tables 74, 76, then the router sends the network packet out of a port designated to be a default output port.

The metrics table 80 can specify possible performance metrics associated with each router port, and with each network entity to which the router port is coupled. For example, a cost value represents a link cost of the next route (e.g., a value associated with a bandwidth or a link delay associated with a link), a server load is a value corresponding to a percentage traffic load upon a network device, for example a server, to which a router port is coupled, and a router load is a value corresponding to a percentage traffic load upon the router port.

From the metrics table 80, it should be apparent that an expected performance of each router port can be identified. In some cases, for example, at entry 78a of the next hop table 78, two ports, J an K, are identified as potential ports out of which a network packet can be sent. A corresponding portion 80a of the metrics table 80 identifies that the two ports J and K have different expected performances at a particular time. For example, the port J is currently sixty percent loaded, while the router port K is currently twenty percent loaded. Also, the network device, for example a server, to which the port J is coupled is 100 percent loaded while the network device to which port K is coupled is zero percent loaded. Therefore, it would be expected that the network packet, if sent to port K, would propagate to the next router more quickly than if it were sent to the router port J. The decision of which port to select in the above example, J or K, can be made based selected ones of the possible metrics, e.g., the next link cost, the server load, and the router load.

Figure 4:
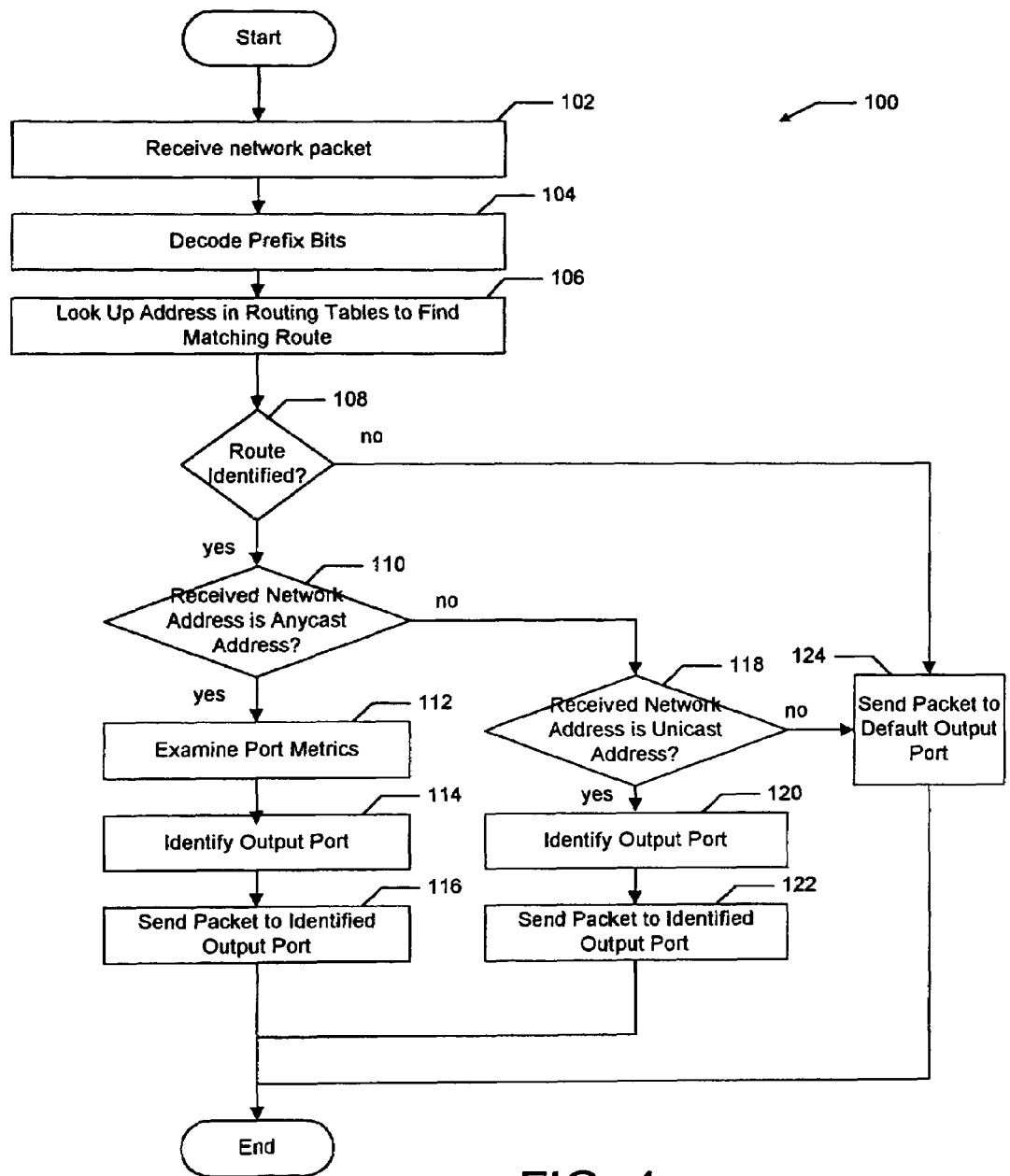
FIG. 4 is a flow chart showing a process of routing unicast and anycast network addresses.

It will become apparent in conjunction with FIG. 4, that metrics, for example metrics contained in the metrics table 80, can be used by the anycast addressing to identify a shortest path the eventual destination of a network packet.

The prefix FP can identify the network address 70 as being a unicast address, an anycast address, or both a unicast and an anycast network address. In one exemplary embodiment, the network address 70 identifies a unicast address by a 001 prefix, an anycast address by a 010 prefix, and a both address by a 011 prefix. Others of the eight possible prefixes associated with the three most significant bits can be reserved for future use.

For an address that exists for both a unicast address and for an anycast address, by providing the "both" prefix, meaning that the address applies to both a unicast and an anycast address, the number of entries in the routing table for this address is reduced from two to one since they share same TLA ID, NLA ID, and SLA ID (and RES bits). Therefore, it should be recognized that by having the 'both' prefix, the routing tables, i.e., the first, second, and third trie-tables 72, 74, 76 can be substantially reduced in size by eliminating the need to have separate entries in the routing table for the unicast and for the anycast addresses. It will, however, be recognized that the address 70 is shown for convenience including only the FP, TLA, RES, and NLA address bits (forty-eight bits), but the address 70 can also include the SLA address bits (FIG. 2) for a total of sixty four bits.

While the number of entries in the trie-tables 72, 74, 76 may be reduced as described above, the number of entries in the next hop table 78 may be increased, since the next hop table 78 can include next hop information for both unicast and anycast addresses.

While three trie-tables 72, 74, 76 are shown, it should be understood that the network address 70 can be partitioned in other ways corresponding to fewer than three or more than three trie-tables. Also, while the prefix bits, FP, are shown to have particular bit codings, in other embodiments, other codings can be used within the eight possible codings corresponding to the three prefix bits, FP. Also, in other embodiments, more than three or fewer than three prefix bits, but at least two prefix bits, can be used. While three particular metrics have been shown and described in conjunction with the metrics table 80, in other embodiments, more than three or fewer than three metrics (including no metrics) can be provided in the metrics table 80.

Referring now to FIG. 4 a process 100 for routing a network packet begins at step 102, where the network packet is received. At step 104, the prefix bits, which can be the prefix bits, FP, of FIGS. 2 and 3 are decoded.

In step 106, a destination network address portion of the network packet received at step 102 is matched with routing tables and a next hop table, for example the first, second and third trie-tables 72, 74, 76 and the next hop table 78 of FIG. 3, in order to identify a matching address and an associated one or more output ports associated with a router, out of which the network address can be sent.

At step 108, if a route is identified at step 106 along with the one or more ports, the process continues at step 110, where, if the prefix bits decoded at step 104 indicate that the network address is an anycast address, the process continues to step 112. At step 112, if more than one port is identified in conjunction with the identified route at step 108, port metrics are examined. For example, the port metrics shown in the metrics table 80 of FIG. 3 are examined. At step 114, a port is selected from among the more than one port based upon the port metrics examined at step 112. At step 116, the network packet is sent out of the router port identified at step 114.

At step 110, if the received network address is not an anycast network address, the process continues at step 118, where, if the prefix bits decoded at step 104 indicate the network address is a unicast address, the process continues to step 120 where an output port is identified. At step 122, the network packet is sent out of a router port identified at step 120.

If, at step 108, if no route is found in the routing tables, the process continues to step 124. At step 124, the network packet is sent out of a predetermined default router port.

Figure 5:
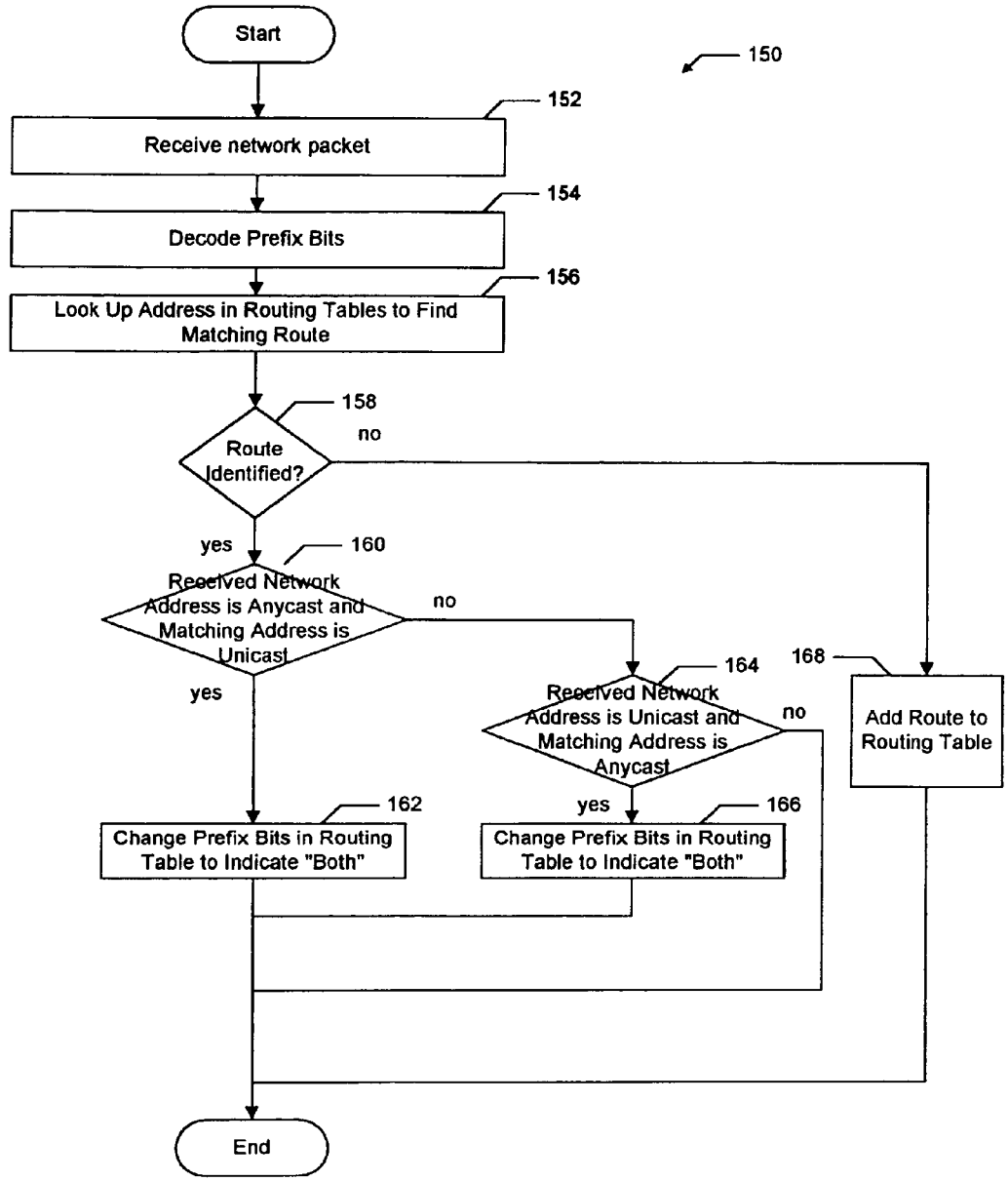
FIG. 5 is a flow chart showing a process of generating a routing table having unicast and anycast addresses.

Referring now to FIG. 5, a process for adding a route to a routing table begins at step 152, where the network packet is received. At step 154, the prefix bits, which can be the prefix bits, FP, of FIGS. 2 and 3 are decoded to determine if the address is an anycast address, a unicast address, or both an anycast and a unicast address.

In step 156, a source network address portion of the network packet received at step 152 is matched with existing routing tables, for example the first, second and third trie-tables 72, 74, 76, of FIG. 3 to identify a matching address and an associated output port associated with a router.

At step 158, if a route is identified at step 156, the process continues at step 160, where, if the prefix bits decoded at step 154 indicate the network address is an anycast address and if the matching address corresponds to a unicast address, the process continues to step 162. At step 162, prefix bits associated with the matching address stored in the routing tables are changed to indicate "both" as described above in conjunction with FIG. 3. In this way, the matching address does not need to be stored twice in the routing tables, once as a unicast address, and once as an anycast address.

If at step 160, the received network address is not an anycast address, the process continues at step 164 where, if the received network address is instead a unicast address and the matching address is an anycast address, then the process continues to step 166. At step 166, prefix bits associated with the matching address stored in the routing tables are changed to indicate "both" as described above.

If, at step 158, no route is identified in association with a matching address, then the process proceeds to step 168, where a source address portion of the network packet is examined to determine if a new entry can be made in the routing tables indicating a new route. If a new route is appropriate, it is added to the routing tables.

Having described preferred embodiments of the invention it will now become apparent to those of ordinary skill in the art that other embodiments incorporating these concepts may be used. Additionally, the software included as part of the invention may be embodied in a computer program product that includes a computer useable medium. For example, such a computer usable medium can include a readable memory device, such as a hard drive device, a CD-ROM, a DVD-ROM, or a computer diskette, having computer readable program code segments stored thereon. Accordingly, it is submitted that that the invention should not be limited to the described embodiments but rather should be limited only by the spirit and scope of the appended claims. All publications and references cited herein are expressly incorporated herein by reference in their entirety.

What is claimed is:

1. A computer readable storage medium on which is stored executable code, comprising:
   a network address comprising:
   prefix bits encoded to identify the network address as a selected one from a group consisting of a unicast network address, an anycast network address, and both the unicast and the anycast network address;
   anycast scope identifier bits to identify an anycast scope, wherein the anycast scope corresponds to a network scope within which the anycast network address is recognized; and
   anycast group identifier bits to identify an anycast group having one or more anycast members, wherein each of the one or more anycast members is associated with the same anycast network address; and
   wherein the code when executed performs lookups associated with the network address in one or more routing tables.

2. The computer readable medium of claim 1, wherein the prefix bits include at least two prefix bits as the three most significant bits of the network address, and the anycast group identifier bits include at least thirty-two bits as the least significant bits of the network address.

3. The computer readable medium of claim 1, wherein the anycast scope bits include at least two bits adapted to identify a selected one of a node local scope, a link local scope, a site local scope, and a global scope.

4. The computer readable medium of claim 1, wherein the network address has a network address length of one hundred twenty eight bits, and the network address is compatible with Internet protocol version six (IPv6).

5. The computer readable medium of claim 4, wherein top level aggregation identifier, next-level aggregation identifier, and site-level aggregation identifier portions of the one hundred twenty eight network address bits are at the same bit locations and have the same function for both the anycast network address and for the unicast network address.

6. A network router including one or more routing tables having one or more entries, the entries comprising:
   prefix bits encoded by a computer processor to identify the network address as a selected one from a group consisting of a unicast network address, an anycast network address, and both the unicast and the anycast network address;
   anycast scope identifier bits to identify an anycast scope, wherein the anycast scope corresponds to a network scope within which the anycast network address is recognized; and
   anycast group identifier bits to identify an anycast group having one or more anycast members, wherein each of the one or more anycast members is associated with the same anycast network address; and
   wherein the network router performs lookups associated with the network address in the one or more routing tables.

7. The network router of claim 6, wherein the prefix bits include at least two prefix bits as the three most significant bits of the network address, and the anycast group identifier bits include at least thirty-two bits as the least significant bits of the network address.

8. The network router of claim 6, wherein the anycast scope bits include at least two bits adapted to identify a selected one of a node local scope, a link local scope, a site local scope, and a global scope.

9. The network router of claim 6, wherein the network address has a network address length of one hundred twenty eight bits, and the network address is compatible with Internet protocol version six (IPv6).

10. The network router of claim 9, wherein top level aggregation identifier, next-level aggregation identifier, and site-level aggregation identifier portions of the one hundred twenty eight network address bits are at the same bit locations and have the same function for both the anycast network address and for the unicast network address.

11. A method of routing a network packet having a network address, comprising:
   receiving the network packet; and
   decoding by a computer processor prefix bits associated with the network address to identify the network address as being a selected one from a group consisting of a unicast network address, an anycast network address, and both the unicast and the anycast address; and
   performing lookups associated with the network address in one or more routing tables.

12. The method of claim 11, wherein the prefix bits include at least two bits encoded to indicate a selected one of the unicast network address, the anycast network address, and both the unicast network address and the anycast network address.

13. The method of claim 11, further including:
   identifying an output port from the successive lookups;
   sending, if the output port is identified and if the network address is the unicast network address, the network packet to the identified output port; and
   sending, if the output port is identified and if the network address is the anycast network address, the network packet to the identified output port.

14. The method of claim 13, further including:
   if the output port is identified as more than one output port and if the network address is the anycast network address:
   examining port metrics associated with the more than one output port;
   identifying one output port from among the more than one output port based upon the metrics; and
   sending the network packet to the identified output port.

15. The method of claim 13, wherein one of the one or more routing tables is associated with sixteen most significant bits of the network address.

16. The method of claim 13, wherein one of the one or more routing tables is associated with sixteen most significant bits of the network address and other ones of the one or more routing tables are associated with respective groups of eight bits of the network address.

17. A method of generating a routing table associated with a network packet having a network address, comprising:
   receiving the network packet;
   decoding by a computer processor prefix bits associated with the network address to identify the network address as being a selected one from a group consisting of a unicast network address, an anycast network address, and both the unicast and the anycast address;
   performing lookups associated with selected ones of the bits of the network address in one or more routing tables to identify a matching route stored in the one or more routing tables;
   changing, if the matching route is identified and if the matching route corresponds to the unicast network address and if the network address is the anycast network address, the prefix bits associated with the matching route stored in the one or more routing tables to indicate that the matching route corresponds to both the unicast network address and the anycast network address; and
   changing, if the matching route is identified and if the matching route corresponds to an anycast network address and if the network address is the unicast network address, the prefix bits associated with the matching route stored in the one or more routing tables to indicate that the matching route corresponds to both the unicast network address and the anycast network address.

18. The method of claim 17, wherein the selected ones of the bits of the network address correspond to sixty-one bits.

19. The method of claim 17, wherein the prefix bits include at least two bits encoded to indicate a selected one of the unicast network address, the anycast network address, and both the unicast network address and the anycast network address.

20. The method of claim 17, wherein one of the one or more routing tables is associated with sixteen most significant bits of the network address.

21. The method of claim 17, wherein one of the one or more routing tables is associated with sixteen most significant bits of the network address and other ones of the one or more routing tables are associated with respective groups of eight bits of the network address.

22. A computer readable medium having computer readable code stored thereon for routing a network packet having a network address, comprising:
   instruction for receiving the network packet;

instructions for decoding prefix bits associated with the network address to identify the network address as being a selected one from a group consisting of a unicast network address, an anycast network address, and both the unicast and the anycast address; and instructions for performing lookups associated with the network address in one or more routing tables.

23. The computer readable medium of claim 22, wherein the prefix bits include at least two bits encoded to indicate a selected one of the unicast network address, the anycast network address, and both the unicast network address and the anycast network address.

24. The computer readable medium of claim 22, further including:

instructions for identifying an output port from the successive lookups; instruction for deciding if the output port is identified and if the network address is the unicast network address, and in response thereto, instructions for sending the network packet to the identified output port; and instruction for deciding if the output port is identified and if the network address is the anycast network address, and in response thereto, instructions for sending the network packet to the identified output port.

25. The computer programmable medium of claim 24, further including:

instruction for deciding if the output port is identified as more than one output port and if the network address is the anycast network address, and in response thereto:

instructions for examining port metrics associated with the more than one output port, instructions for identifying one output port from among the more than one output port based upon the metrics; and instructions for sending the network packet to the identified output port.

26. The computer readable medium of claim 24, wherein one of the one or more routing tables is associated with sixteen most significant bits of the network address.

27. The computer readable medium of claim 24, wherein one of the one or more routing tables is associated with sixteen most significant bits of the network address and other ones of the one or more routing tables are associated with respective groups of eight bits of the network address.

28. A computer readable storage medium having computer readable code stored thereon for generating a routing table associated with a network packet having a network address, comprising:

instructions for receiving the network packet;

instructions stored on the computer readable medium for decoding prefix bits associated with the network address to identify the network address as being a selected one from a group consisting of a unicast network address, an anycast network address, and both the unicast and the anycast address;

instructions for performing lookups associated with selected ones of the bits of the network address in one or more routing tables to identify a matching route stored in the one or more routing tables;

instructions for deciding if the matching route is identified and if the matching route corresponds to the unicast network address and if the network address is the anycast network address, and in response thereto for changing the prefix bits associated with the matching route stored in the one or more routing tables to indicate that the matching route corresponds to both the unicast network address and the anycast network address; and instructions for deciding if the matching route is identified and if the matching route corresponds to the anycast network address and if the network address is the unicast network address, and in response thereto for changing the prefix bits associated with the matching route stored in the one or more routing tables to indicate that the matching route corresponds to both the unicast network address and the anycast network address.

29. The computer readable medium of claim 28, wherein the selected ones of the bits of the network address correspond to sixty-one bits.

30. The computer readable medium of claim 28, wherein the prefix bits include at least two bits encoded to indicate a selected one of the unicast network address, the anycast network address, and both the unicast network address and the anycast network address.

31. The computer readable medium of claim 28, wherein one of the one or more routing tables is associated with sixteen most significant bits of the network address.

32. The computer readable medium of claim 28, wherein one of the one or more routing tables is associated with sixteen most significant bits of the network address and other ones of the one or more routing tables are associated with respective groups of eight bits of the network address.

* * * * *